Nov. 11, 1930.     W. C. MARTIN ET AL     1,781,120
SANDING DEVICE FOR MOTOR VEHICLES
Filed April 29, 1929
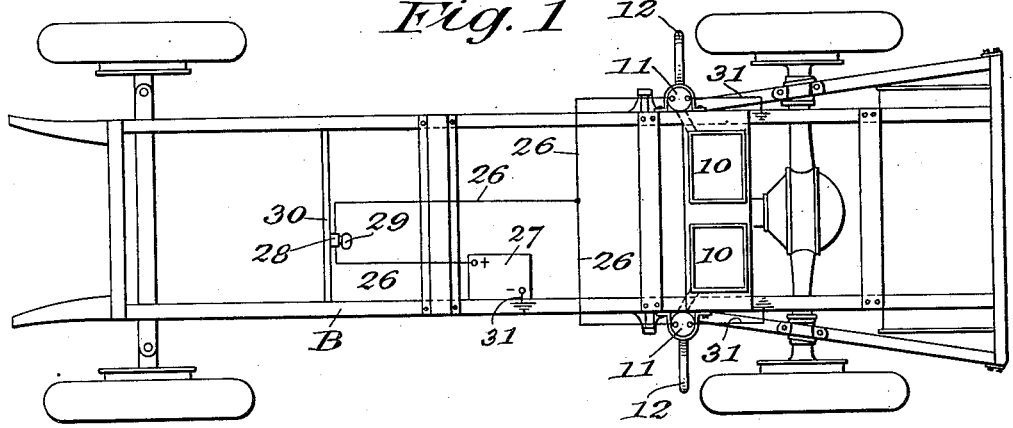
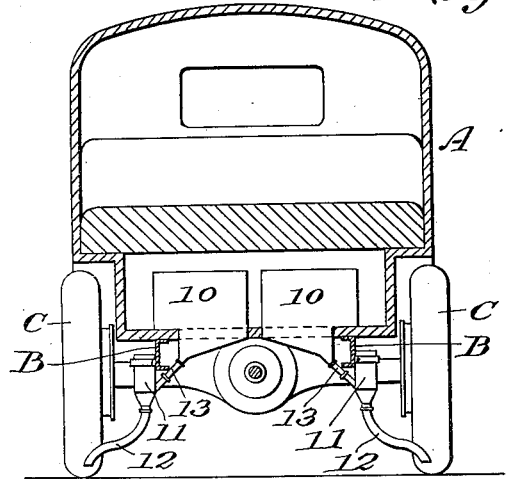
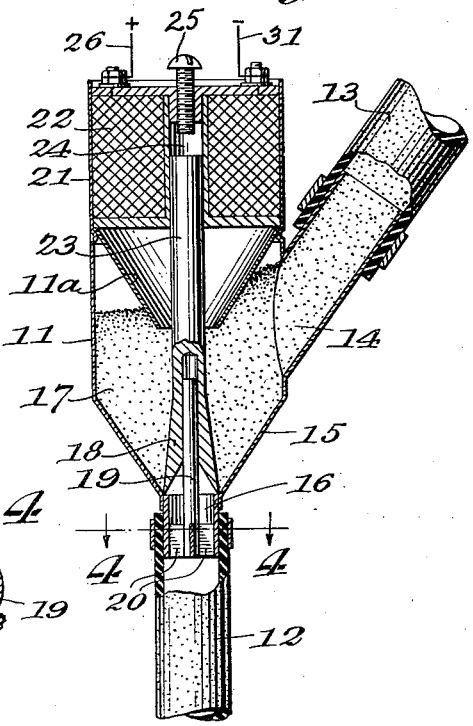
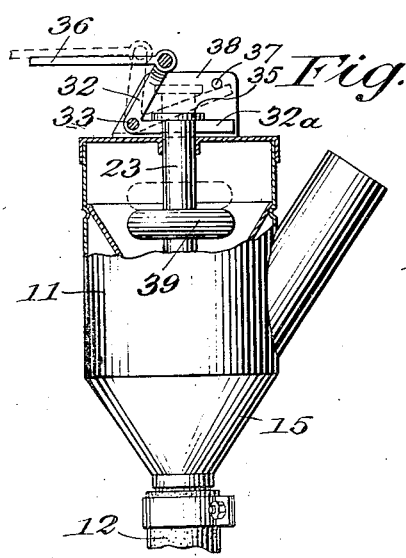
Inventors:
William C. Martin
Wallace Martin
By Macleod, Calver, Copeland & Dike
Attorneys.

Patented Nov. 11, 1930

1,781,120

UNITED STATES PATENT OFFICE

WILLIAM C. MARTIN, OF BOSTON, AND WALLACE MARTIN, OF WATERTOWN, MASSACHUSETTS

SANDING DEVICE FOR MOTOR VEHICLES

Application filed April 29, 1929. Serial No. 358,835.

The invention relates to a new and useful improvement in an attachment for motor vehicles for distributing sand or other material in front of the wheels to prevent skidding. It comprises a container for the sand or other material and having an outlet through which the said material may be at will distributed by the driver of the car, said container being provided with a valve with suitable connections under the control of the driver of the car to open and close the valve at will to permit the said material to be distributed either upon the tires of the wheels or upon the ground in front of the wheels during the progress of the car.

The valve may be controlled electrically or mechanically by means within easy reach of the driver and it is intended that the accompanying claims so far as possible shall broadly cover either of said methods except so far as some of the claims may be limited to the electrically controlled means.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

The invention will be more fully understood from the following description when taken in connection with the accompanying drawings and the novel features thereof will be pointed out and clearly defined in the claims at the close of this specification.

In the drawings:

Fig. 1 is a plan view of a chassis of a motor car equipped with a device embodying the invention having the electrical control.

Fig. 2 is a vertical sectional view of a motor car equipped with the invention, the section being taken directly in front of the rear wheels looking toward the rear.

Fig. 3 is a vertical sectional view of a device embodying the invention equipped with a solenoid for operating the valve.

Fig. 4 is a section on line 4—4 of Fig. 3.

Fig. 5 is a view partly in section of a device embodying the invention equipped with a system of levers for operating the valve.

Referring now to the drawings, there is shown at A the body, at B the chassis, and at C the rear wheels of a motor car equipped with apparatus embodying the invention.

The car is shown as equipped with two sets of apparatus, one for each of the two rear wheels.

At 10—10 are shown two sand boxes or sand reservoirs which supply sand to the valve controlled hoppers 11 from which the sand is discharged through the outlet pipes 12 to the periphery of the rear wheels C or to the ground in front of the said wheels.

A length of hose 13 is shown leading from the sand box to a pipe 14 which delivers into the hopper 11.

The said hopper 11 has a cylindrical upper portion and a tapering lower portion 15, said tapered lower portion having connected with its outlet a tubular member 16 which forms the nose of the hopper and may be made as a separate member attached to the hopper or may be formed integral therewith. The upper end of the member 16 also serves as the valve seat. Secured to the said member 16 is a pipe 12 which extends down in front of the rear wheel C and is adapted to discharge the sand down in front of the rear wheel as already described.

The sand or other granular matter to be distributed by the device is shown at 17.

At 18 is shown a valve which in the preferred form of construction is shaped something like a truncated cone spreading outward toward its lower end and is seated upon the upper end of the tubular member 16 which forms the valve seat. Said valve is adapted to be lifted from its seat to allow the sand to pass out of the hopper down through the pipe 12 to be distributed in front of the rear wheels.

Preferably the said valve is provided with a downwardly extending member which extends into the tube 16 to break up any lumps of sand as they pass from the hopper down into the outlet tube. As shown in the drawings this break-up device has a stem 19 which extends up into a hollow in the stem 23 of the valve 18 and projects down below the lower end of the valve into the nose 16. The said stem 19 is provided at its lower end with radiating wings 20 which divide the outlet passage into a plurality of compartments, there being four of these wings and therefore four compartments shown in the drawings as will be seen by reference to Fig. 4.

The hopper 11 has an upwardly extending portion 21 in which is mounted a solenoid 22. The said valve 18 has a stem 23 extending into the passage 24 in the solenoid. An adjustable stop screw 25 is connected with the head of the solenoid to limit the upward movement of the valve stem 23.

The baffle plate 11ª within the hopper 11 prevents the sand from flying upward into the solenoid.

The solenoid is wired in any suitable manner and a switch is provided in any convenient place easily accessible to the driver of the car to close the circuit and thereby open the valve. As shown in the drawings, the positive wire 26 leads from the battery 27 to the positive pole of each solenoid and is provided with a switch 28 connected with a button 29 conveniently located on the panel 30 accessible to the driver. The negative wire 31 is grounded on the chassis of the machine.

When it is desired to open the valve the driver with close the switch by pressing on the button 29 thereby energizing the solenoid, causing the valve to be lifted from its seat and permitting the sand to be discharged through the pipe 12 to the rear wheels or to the ground in front of the rear wheels.

In the modified form shown in Fig. 5 there is connected with the upper end of the valve stem 23 a bell crank lever 32 pivoted at 33 to a bracket 38 on the hopper 11. The arm 32ª of said bell crank lever is loosely connected with the upper part of the valve stem and the other arm is pivotally connected with the lever 36 which is shown in the drawings broken away, but which may extend to a position accessible to the driver either directly or by intermediate connections. The arm 32ª engages the flange 35 on the valve stem 23. A pin 37 on the bracket 38 serves as a stop to limit the upward movement of the valve stem. A counter weight 39 on the valve stem 23 carries the valve stem downward and closes the valve when the lever 36 is released.

What we claim is:

1. An attachment for vehicles to distribute skid preventing material consisting of a container for the antiskid material having a tapered lower portion provided with a discharge outlet at its lower end, a valve which normally closes said outlet, a stem for said valve which extends upward through said container, means connected with said stem within the control of the operator to lift said valve at will and thereby permit the discharge of said skid preventing material through said outlet and adjustable means for controlling the range of movement of the valve.

2. An attachment for vehicles to distribute skid preventing material consisting of a container for the antiskid material having a tapered lower portion provided with a discharge outlet at its lower end, a valve which normally closes said outlet, a stem for said valve which extends upward through said container and means connected with said stem within the control of the operator to lift said valve at will and thereby permit the discharge of said skid preventing material through said outlet, said container being provided with baffle plates at its upper part and downwardly inclined toward said stem, said baffle plates being located above the portion of the container which holds the anti-skid material.

3. An attachment for vehicles to distribute skid preventing material consisting of a container for the anti-skid material provided with a discharge outlet at its lower end, a conduit into which said outlet discharges, a valve which is normally seated to close said outlet and has a stem which extends upward through said container, means for raising said valve from its seat to open the outlet, said valve and stem being formed with a bore which extends up from the lower end of the valve into said stem to form a bearing for a guide and a stationary guide rod which extends upward into the passage in said valve and stem to guide the valve in its movement.

4. An attachment for vehicles to distribute skid preventing material consisting of a container for the anti-skid material provided with a discharge outlet at its lower end, a conduit into which said outlet discharges, a valve which normally closes the entrance to said outlet from the upper side and has a stem which extends upward into said container, means for raising said valve from its seat, said valve and stem having a bore which extends from the lower end of the valve up into said stem and a stationary guide rod which extends from said outlet passage upward into the hollow interior of said valve stem to steady and guide the valve.

In testimony whereof we affix our signatures.

WILLIAM C. MARTIN.
WALLACE MARTIN.